United States Patent [19]

Taylor

[11] Patent Number: 5,721,824

[45] Date of Patent: Feb. 24, 1998

[54] MULTIPLE-PACKAGE INSTALLATION WITH PACKAGE DEPENDENCIES

[75] Inventor: Julian S. Taylor, Colorado Springs, Colo.

[73] Assignee: Sun Microsystems, Inc., Mountain View, Calif.

[21] Appl. No.: 635,329

[22] Filed: Apr. 19, 1996

[51] Int. Cl.$^6$ ..................................................... G06F 9/44
[52] U.S. Cl. ........................................ 395/200.33; 395/712
[58] Field of Search ............................ 395/200.33, 200.5, 395/200.51, 200.52, 670, 703, 712

[56] References Cited

U.S. PATENT DOCUMENTS

| | | | |
|---|---|---|---|
| 5,359,730 | 10/1994 | Marron | 395/670 |
| 5,493,682 | 2/1996 | Tyra et al. | 395/712 |
| 5,504,905 | 4/1996 | Clearly et al. | 395/653 |
| 5,634,058 | 5/1997 | Allen et al. | 395/712 |
| 5,649,187 | 7/1997 | Hornbuckle | 395/653 |
| 5,666,501 | 9/1997 | Jones et al. | 395/712 |

Primary Examiner—Ellis B. Ramirez
Attorney, Agent, or Firm—William J. Kubida; Homer L. Knearl; Holland & Hart LLP

[57] ABSTRACT

Installation of a multi-package distribution software pack is split into installation of each dominant, or primary, package and installation of the dependent, or secondary, packages dependent on that dominant package. The dependent packages are installed before or after installation of the dominant package depending upon the constraints of the target system for the installation. As the dominant package is installed or delayed for later installation, an action list of dependent packages to be installed is built, and a trailer script executable by the installation utility is created to install the dependent packages on the action list. Since a dependent package may also be a dominant package, the flow of operations in the invention are layered to add additional entries on the action list for additional dependent packages dependent from a dominant package that is dependent from another dominant package.

19 Claims, 4 Drawing Sheets

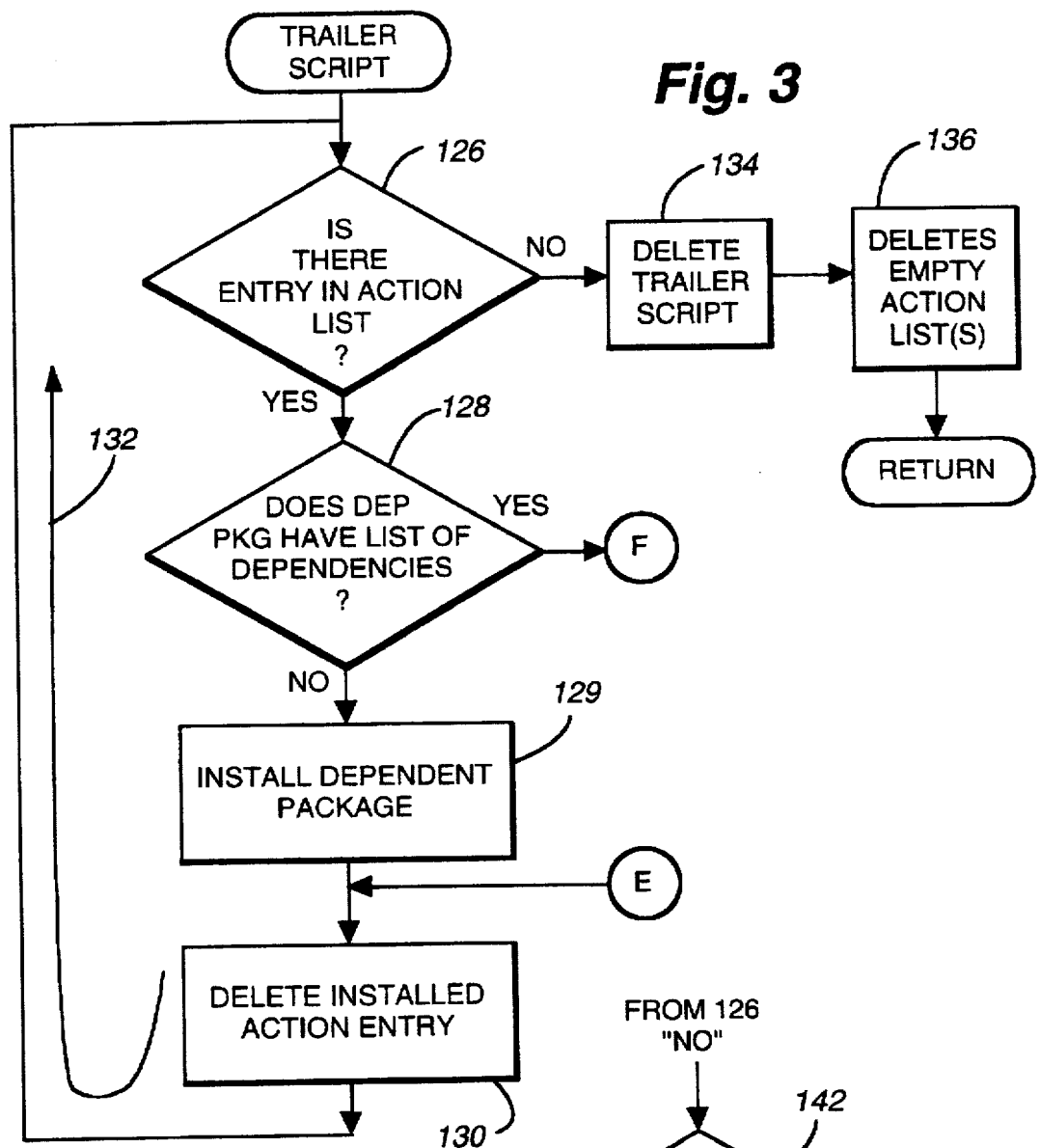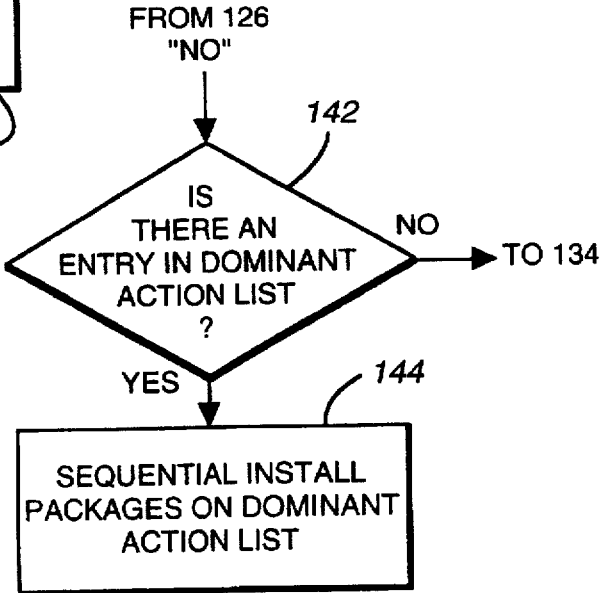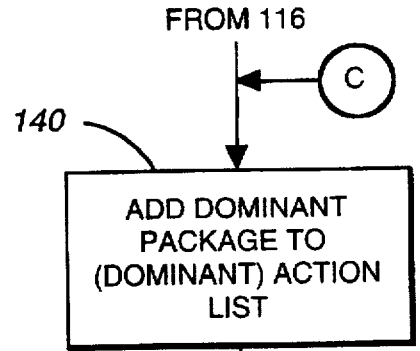

MULTIPLE-PACKAGE INSTALLATION WITH PACKAGE DEPENDENCIES

BACKGROUND OF THE INVENTION

1. Field of the Invention

This invention relates to installing software products, herein referred to as software packages or packages, on computing systems either in a distributed processing computing system having a server and multiple clients or singular systems not connected to a network (a standalone). More particularly, the invention relates to installing a software package having at least one dependent software package also to be installed on a server or standalone file space, multiple client file space or both in the file system of the server and one or more clients.

2. Description of Related Art

In a distributed processing system, multiple client computer workstations, i.e., clients, attached to a server computing system, i.e., server, are provided with computer services, particularly file system services, from the server. In the server, there is a large capacity non-volatile storage device, such as a hard disk drive, for storing the operative program and data files used by the server. In addition, this storage device also stores in files allocated to each client's operative programs and data.

Each client is connected through a network file system, NFS, to the Unix file system, UFS, in the server. The client need not have its own disk drive for storing program and data files. In effect, client program and data files in the server are downloaded to virtual disk drives in memory in the client as the program and data files of the client are needed for operation.

In a standalone computing system, a standalone file system resembles a server with file systems in every aspect except that it does not make any of its file systems available to clients.

To install a new software package onto a system, a package installation utility has been used. In Unix System V Release 4 operating system, this installation utility is pkgadd (package add).

The pkgadd utility program receives software packages for installation usually from a compact disk read only memory (CD ROM). The software package is delivered on optical disks read by the CD ROM driver into the host computing system. The pkgadd utility installs the package by storing the installed package on the hard disk drive in the server.

Where the software to be installed is a primary package and one or more secondary packages upon which the primary package is dependent, the installation of the dependent packages must be done first and then a separate installation of the primary package is performed. These installations are performed one at a time on a server or client system as the case may be.

Since each installation is a time consuming process, what is needed is the capability to install a multi-package distribution pack with package dependencies on a target system (server or client) in a single installation operation.

SUMMARY OF THE INVENTION

In accordance with this invention, the above problem has been solved by splitting the installation of the multi-package distribution pack into installation of each dominant, or primary, package and installation of the dependent, or secondary, packages dependent on that dominant package. The current invention allows for installation of the dependent packages first or last depending upon the constraints of the target system. As the dominant package is installed or delayed for later installation, an action list of dependent packages to be installed is built, and a trailer script executable by the installation utility is created to install the dependent packages on the action list. Since a dependent package may also be a dominant package, the flow of operations in the invention are layered to add additional entries on the action list for additional dependent packages dependent from a dominant package that is dependent from another dominant package.

In a method implementation of the invention, the installation in a computing system of a multi-package distribution pack, where at least one of the software packages in the pack is dependent on another dominant package in the pack, begins by reading a dependency list for each dominant package to be installed. The dependency list identifies dependent packages that the dominant package is dependent upon. If the dominant package has a dependent package not already installed, the method constructs a trailer script process and an action list. The action list has action entries identifying dependent packages not previously installed. The trailer script process controls installation of the dependent packages on the action list. The method first installs the dominant package and then executes the trailer script process to install the dependent packages on the action list.

The method implementation of the invention also detects whether the dominant package has a dependency list of dependent packages. If there is a dependency list, a dependency entry identifying a dependent package is read from the list, and the system is checked to see if the dependent package has already been installed. If the dependent package has not been installed, an action entry is added to the action list for the dependent package. If the dependent package has been installed, the next dependency entry on the dependency list is read, and an action entry is added if necessary. When all dependent packages, not previously installed, have an action entry on the action list, the dominant package is installed.

In another embodiment of the invention, the dominant package may be inserted at the end of the action list and thus cause the dominant package installation to be delayed until all dependent packages are installed.

In further features of the invention, the trailer script process detects an action entry on the action list and installs the dependent package identified by the action entry. The trailer script process then deletes from the action list the action entry for the dependent package just installed. Finally the executed trailer script clears the trailer script and the action list from the computing system when the action list is empty.

In another embodiment of the invention, the method also tests whether the dependent package, identified by the action entry from the action list, is also a dominant package having additional dependent packages. If a dependent package also has additional dependent packages, the method identifies the additional dependent packages and adds action entries on the action list for the additional dependent packages. Then the dependent package having the additional dependent packages is installed, and the action entry for that dependent package is deleted from the action list.

The above computer implemented steps in another implementation of the invention are provided as an article of manufacture, i.e., a computer storage medium containing a computer program of instructions for performing the above described steps.

In a machine implementation of the invention apparatus for installing a plurality of dominant and dependent software packages in a computer has a plurality of modules. A test module tests whether or not a dominant package to be installed has dependent packages to be installed. A construct module constructs an action list if said test module indicates the dominant package has a dependent package not already installed. The action list has action entries, each action entry identifying a package to be installed. A trailer script module controls installation of packages on the action list. An action entry add module adds to the action list the dependent package not already installed, and an install module installs the dominant package and calls the trailer script module to install packages on the action list.

In a feature of the invention the install module uses the action entry add module to add an entry for the dominant package at the end of the action list. Then the trailer script module, when called by the install module, installs the dependent packages and the dominant package identified on the action list.

In another feature of the invention the install module has a primary install module installing the dominant package directly. The trailer script module, when called by said install module, installs only the dependent packages identified on the action list.

The trailer script module of the invention has a detection module detecting an action entry on the action list, and an action entry install module installing the dependent package identified by the action entry. As a further feature of the invention the trailer script module also has a delete module deleting from the action list the action entry for the dependent package installed by said action entry install module.

As a further feature of the invention a dependency check module is provided. This check module checks whether the dependent package, identified by the action entry from the action list, is also a dominant package having additional dependent packages. If the dependent package is also a dominant package having addition dependent packages, the action entry add module identifies the additional dependent packages and adds action entries on the action list for the additional dependent packages. The action entry install module installs the dependent package having additional dependent packages, and the delete module deletes from the action list the action entry for the dependent package having additional dependent packages.

The great advantage and utility of the present invention is that a multi-package distribution pack may be installed with a single load on the computing system. The packages within the pack do not have to be separately loaded. This structural detail is hidden from the user.

The foregoing and other features, utilities and advantages of the invention will be apparent from the following more particular description of a preferred embodiment of the invention as illustrated in the accompany drawings.

BRIEF DESCRIPTION OF DRAWINGS

FIG. 3 shows the trailer script operations called from FIG. 2.

FIG. 4 shows an add operation to replace install operation 122 in FIG. 2B whereby the dominant package is installed from the action list.

FIG. 5 shows additional operations for an embodiment of the invention where dominant packages are installed from a dominant package action list.

DETAILED DESCRIPTION OF PREFERRED EMBODIMENTS

Figure 1:
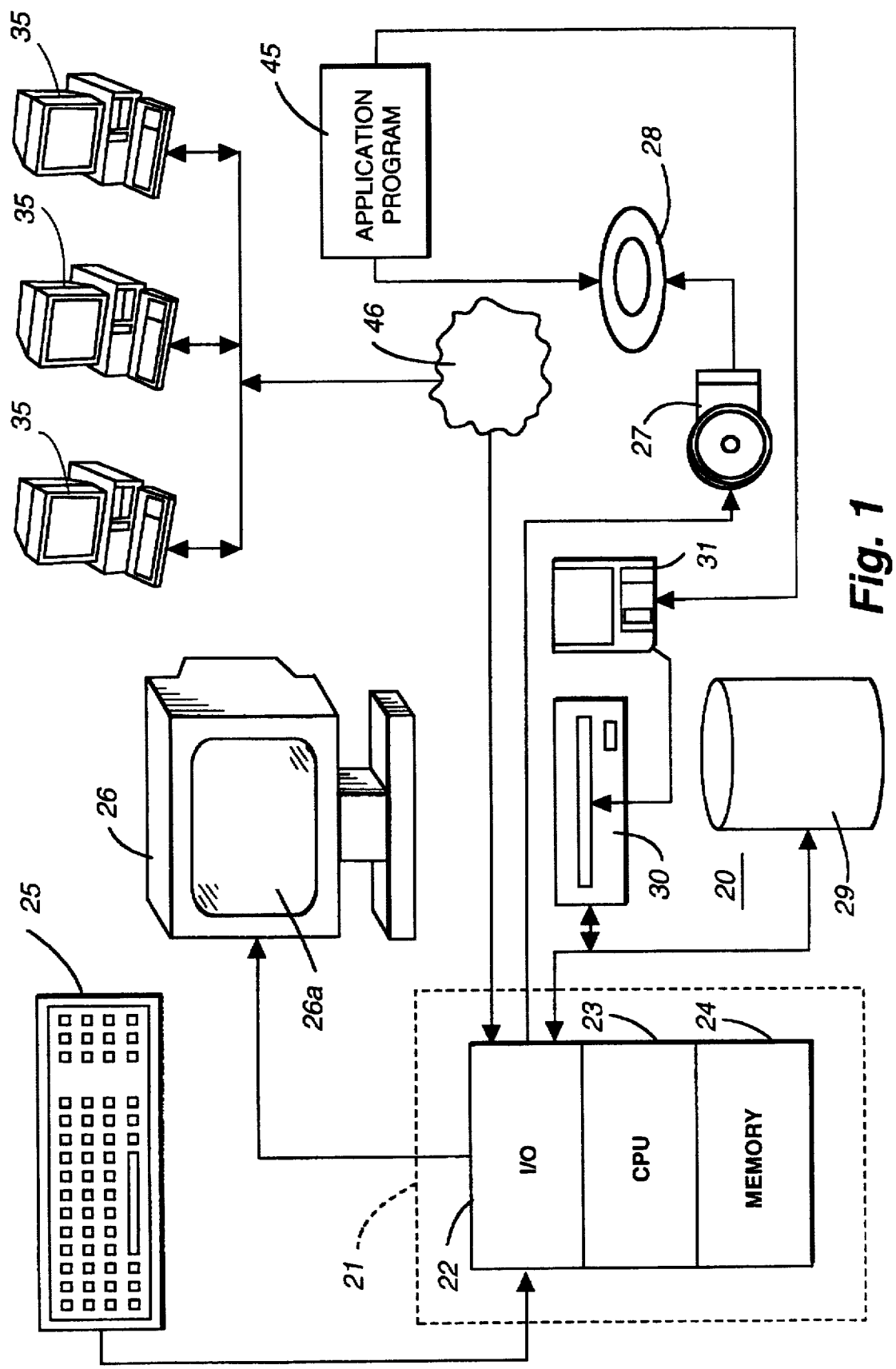
FIG. 1 illustrates a client/server distributed processing system having a server computing system and a plurality of client workstations connected in a network to perform the logical operations of the invention.

The embodiments of the inventions described herein are implemented as logical operations in a computing system. The logical operations of the present invention are implemented (1) as a sequence of computer implemented steps running on a computing system and (2) as interconnected machine modules within a computing system. The method implementation or machine implementation is a matter of choice dependent on the performance requirements of the computing system implementing the invention. Accordingly, the logical operations making up the embodiments of the invention described herein are referred to variously as operations, steps or modules.

In accordance with a preferred embodiment of the invention, a server installs a multi-package distribution pack on the server storage system. To this end, and referring first to FIG. 1, the computing system 20, acting as a server performing the operations of installing the multi-package distribution pack 45. CPU 23 performs the installation at the server 20 for the server file system or client file systems in the server. The client file systems in the server provide program and data files to client stations 35 connected to the server the network 46. Three clients are illustrated in FIG. 1.

In FIG. 1, processor 21 includes an input/output section 22, a central processing unit 23, and a memory section 24. The input/output section 22 is connected to a keyboard 25, a display or monitor 26, and a disk storage unit 29 as well as an optical disk drive unit 27 for reading a cd-rom 28 and a floppy disk drive unit 30 for reading a diskette 31. Distribution pack 45 may be loaded into the computing system 20 from either the cd-rom 28 or diskette 31. The input/output unit 22 includes a communications adaptor communicating on the network 46 to the remote client stations. Examples of computing systems that may be used as either a server 20 or a client 35 include the SPARC[1] TM systems offered by Sun Microsystems TM, Incorporated, personal computers offered by IBM Corporation and by other manufacturers of IBM compatible personal computers and systems running the UNIX[2], OS/2[3], AIX, DOS, etc. operating systems.

[1] SPARC is a trademark of Sun Microsystems, Inc.
[2] UNIX is a trademark Licensed by X/Open Company Ltd.
[3] OS/2 and AIX are trademarks of IBM Corporation.

The distribution pack handled by this invention has multiple packages to be installed. These multiple packages have primary, or dominant, packages and secondary, or dependent, packages. A primary package may have secondary packages on which it is dependent. A primary package may also be dependent from another primary package. Thus a primary package may be primary in one installation and secondary in another installation.

Figure 2A:
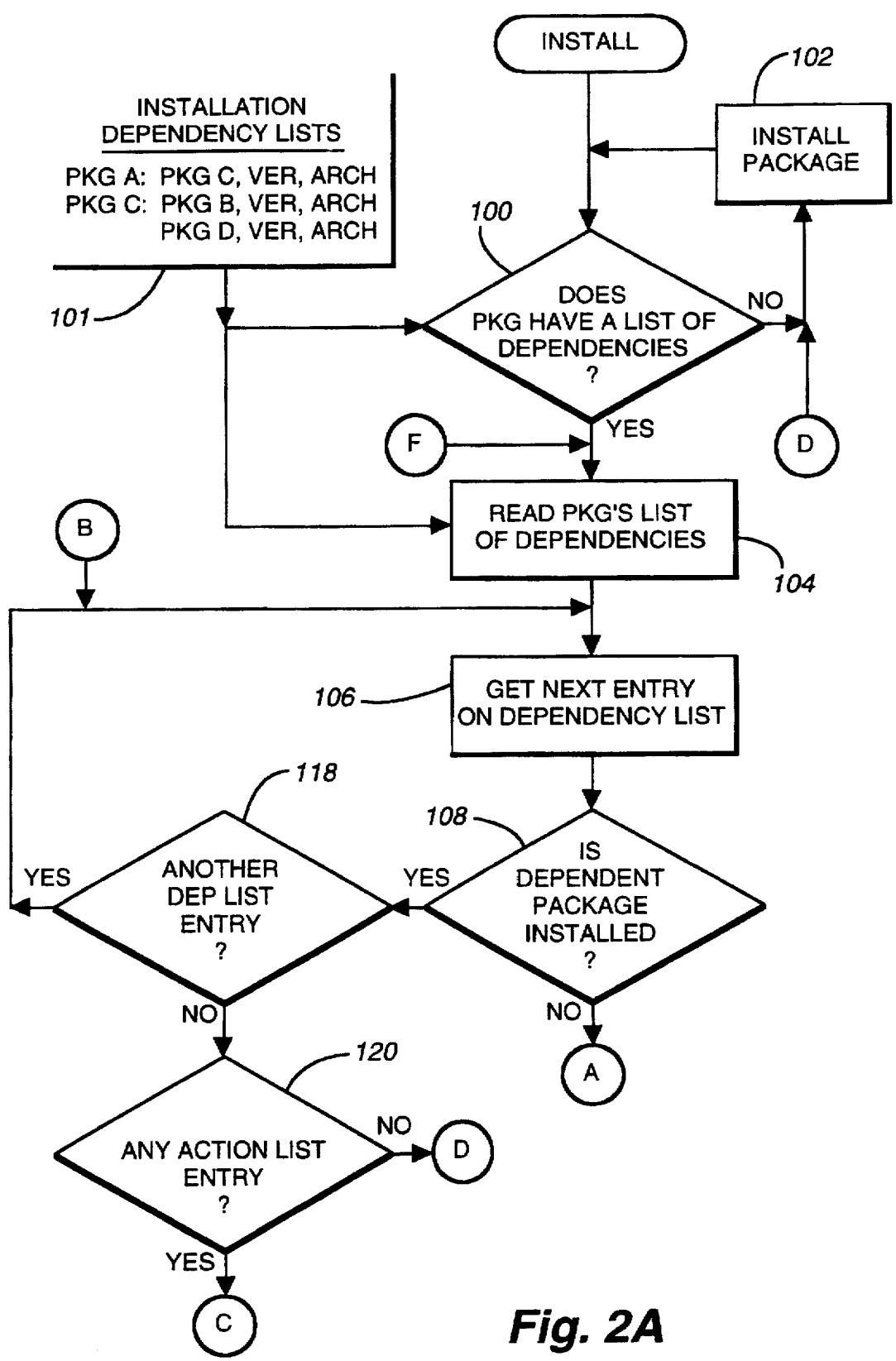
FIG. 2, composed of FIG. 2A and FIG. 2B, illustrates the logical operations of the preferred embodiment of the invention for installing primary, or dominant, packages and their secondary, or dependent, packages.

In FIG. 2A, the install package logical operations for a distribution pack of multiple packages begins at decision operation 100 which tests whether the first primary package in the installation dependency lists 101 has a list of dependent secondary packages. If there is no list for the primary package, the process branches "no" to operation 102 which proceeds to use the package add utility to install the primary package. After the package is installed, the process returns to decision operation 100 to test whether the next primary package to be installed has a list of dependencies.

Installation dependency list 101 in FIG. 2A is exemplary of an distribution pack having multiple packages with dependencies. Package A and Package C are primary packages. Package C is also a secondary package in Package A's dependency list. Packages B and D are secondary packages in Package C's dependency list. The installation dependency list 101 would be provided in the package information (pkginfo) file received with the multiple package to be installed.

The first primary package on the installation dependency lists is Package A which has a dependency list including package C. Accordingly, decision operation 100 branches "yes" to operation 104 to read the list for the primary Package A from installation dependency lists 101.

After operation 104 at the server has read the dependency list for Package A, operation 106 gets the first entry off Package A's dependency list which is secondary Package C on which Package A depends. Decision operation 108 tests whether the dependent Package C has been installed. Since the dependent package (Package C) has not been installed, the flow of operations branches "no" to decision operation 110 in FIG. 2B.

Figure 2B:
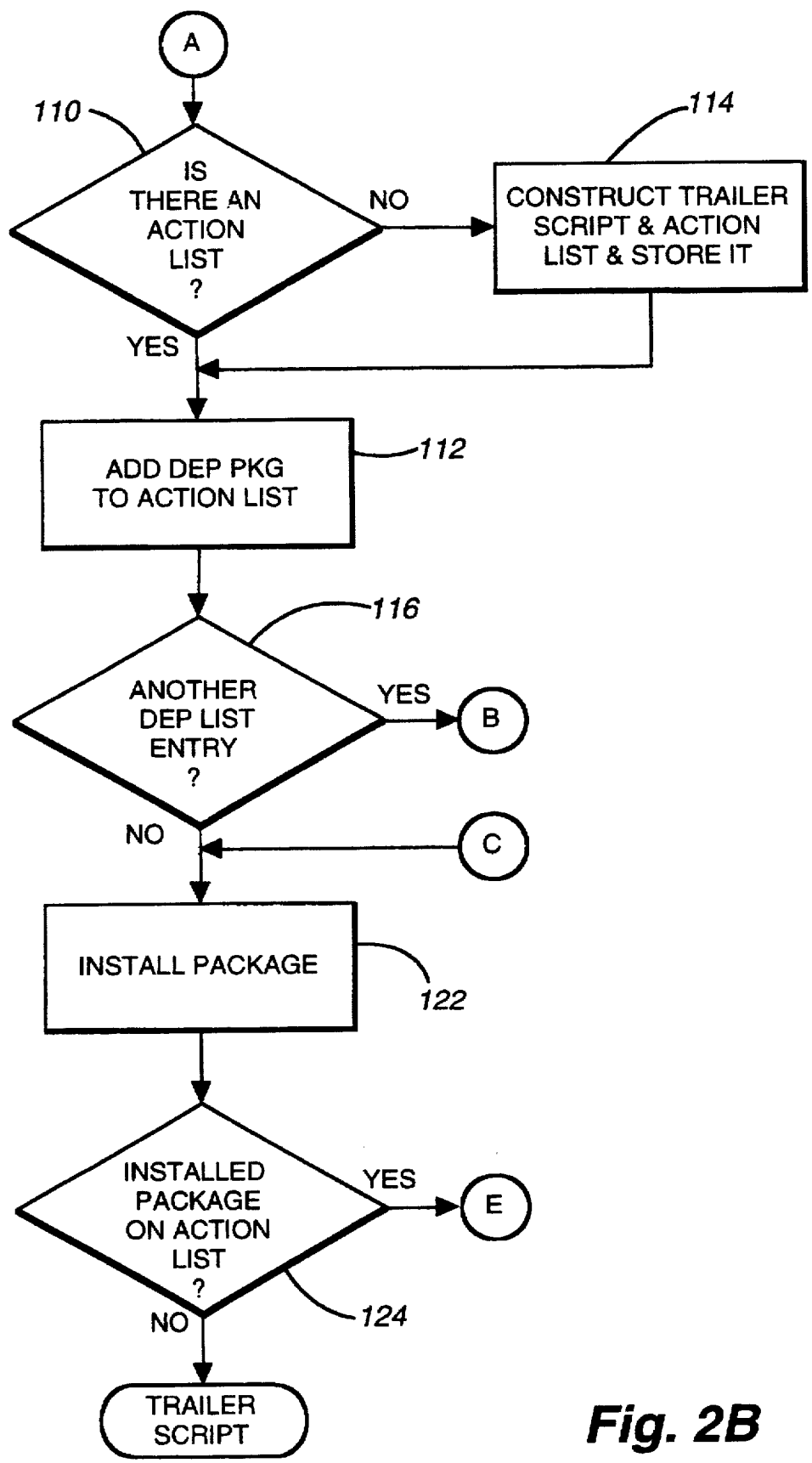

In FIG. 2B, decision operation 110, detects whether there is an action list. An action list is a list of those dependent packages that will be subsequently installed by a trailer script after the present package (primary Package A in the example) is installed. If there is an action list, add module 112 adds the name of the dependent package to the action list. If there is no action list, decision operation 110 branches "no" to the trailer script construct module 114. Trailer script construct module builds the trailer script and creates the action list to be used by the trailer script. A script program is a program designed to be executed by the pkgadd utility to perform operations specified by the script. The trailer script will be executed by pkgadd utility to assist installation of packages on the action list. After the trailer script construct module 114 has built and stored the trailer script and the action list, operation 112 adds the name of the dependent package to the action list.

Decision operation 116 then tests whether there is another entry on the dependency list for Package A. If there is another entry, the process returns to operation 106 in FIG. 2A to get the next entry off the dependency list. There are no other dependent packages listed in the Package A dependency list in installation dependency lists 101. Therefore, decision operation 116 in FIG. 2B would branch "no" to finish package install module 122. However for the moment, assume that there was another dependent package in the Package A dependency list and assume this next dependent package had already been entered earlier during another install operation. Then decision operation 108 in FIG. 2A would branch the flow of operations "yes" to decision operation 118. In other words, there was another dependent package, but it is already installed.

In FIG. 2A decision operation 118 tests whether there are any more dependency list entries and if there are returns the process to operation 106. If on the other hand there are no more dependent packages listed on the dependency list for the primary package, operation 118 branches "no" to operation 120. Operation 120 tests whether there are any action list entries. If there are no action list entries, the primary package may be installed without the necessity of installing secondary, or dependent, packages, i.e., using the trailer script. Thus, the process branches "no" from decision operation 120 to operation 102 to install the primary package. On the other hand, if decision operation 120 detects that there is an entry on the action list, the process branches "yes" to operation 122 in FIG. 2B. Operation 122 installs the primary package; however, the difference now is that, following operation 122 and decision operation 124, the trailer script is executed. This is necessary since there are dependent packages on the action list that must now be installed.

Decision operation 124 is checking that the package just installed by operation 122 was not on the action list. The purpose of this checking operation will be described hereinafter.

Now returning to the example of Package A from the installation dependency lists 101, after add module 112 lists Package C on the action list, decision operation 116 branches "no" to operation 122 because Package C is the only secondary package listed for Package A. Therefore operation 122 proceeds to install Package A, and decision operation 124 tests whether Package A was on the action list. Since Package A is not on the action list the operation flow branches to execute the trailer script shown in FIG. 2 as built for Package C by construct module 114.

The trailer script module of FIG. 3 begins at decision operation 126 which detects if there is an entry on the action list. There will be an entry on the action list otherwise the trailer script module would not have been called. Decision module 128 retrieves and test whether the first dependent package identified by name on the action list also has a list of dependencies. In the present example, Package C is the first and only package presently on the action list and does have a list of dependencies (see Package C list in Installation Dependency Lists 101 of FIG. 2A). Therefore, operation flow branches "yes" from decision operation 128 to operation 104 in FIG. 2A.

In the present example, Package C is dependent upon Package B and Package D. Operation 104 reads Package C's dependency list. As discussed above for Package A, the flow of logical operations will proceed in a loop twice through operations 106, 108, 110, 112 and 116. During the first pass through the loop Package B is added to the action list, and during the second pass through the loop Package D is added to the action list. The action list now lists Packages C, B and D.

During the second pass through decision operation 116 in Fig. 1B, there will be no more packages on Package C's dependency list. Therefore, operation 116 branches the operation flow to install package module 122. Install module 122 now uses pkgadd utility to install Package C.

After Package C is installed, decision operation 124 tests whether Package C just installed was on the action list. Since Package C was on the action list, the operation flow branches from decision operation 124 to operation 130 in FIG. 3. Operation 130 deletes the Package C entry from the action list. The action list now lists Packages B and D.

Next, decision operation 126 tests whether there is an action entry remaining on the action list. Since Package B and Package D are listed as entries in the action list, the operation flow branches to decision operation 128. Decision operation 128 retrieves the entry for Package B from the action list and tests whether Package B has a dependency list. Since Package B does not have a dependency list in the installation dependency lists 101, the operation flow branches to module 129 to install Package B.

Once the installation of the dependent package is accomplished by install module 129, the entry for package B is deleted from the action list by operation 130. The trailer script process then returns to decision operation 126 to see if there are any more entries on the action list. The action list now contains only an entry for Packaged D.

Operations 126, 128, 129 and 130 around loop 132 will continue until decision operation 126 detects that all dependency packages identified by entries on the action list have been installed and there name deleted from the action list. If the package being installed is a primary package having a dependency list of secondary packages (like Package C in our example), the flow of operations branches out of loop 132 at operation 128 to operations in FIGS. 1A and 1B, and returns to loop 132 from FIG. 1B at operation 130. The operations in FIGS. 1A and 1B add the names of secondary packages to the action list and installs the primary package.

Returning to the example, Package D is the only item now on the action list. Package D does not have a dependency list. Therefore, operation 128 branches "no" to operation 129, and install operation 129 installs Package D. Delete module 130 then deletes Package D's name from the action list. The action list is now empty.

When the action list is emptied, decision operation 126 branches the trailer script process no to operation 134. Operation 134 deletes the trailer script from temporary storage at the server. Then operation 136 deletes the empty action list from temporary storage at the server. This completes the trailer script operation and the trailer script returns control to module 124 in FIG. 1B. Module 124 has been completed as just described for FIG. 2 and thus the installation of the package with dependencies is complete.

In the alternative preferred embodiment of the invention where dominant or primary packages are installed last rather than first, add module 140 in FIG. 4 replaces install package operation 122 in FIG. 2B. Module 140 creates a dominant package action list the first time a dominant package is to be installed and adds a primary or dominant package to this dominant package action list. Any additional primary or dominant packages in a multiple package install are added to the dominant package action list as they come up for installation.

In addition to add module 140, this alternative embodiment also adds decision operation 142 and install module 144 in FIG. 5 between decision operation 126 and delete operation 134 in FIG. 3. Decision operation 142 tests whether or not there is an entry on the dominant package action list created by install module 140. If there is an entry on the dominant package action list, install module 144 sequentially installs the primary packages on the dominant package action list. Thereafter the operation flow returns to delete step 134 in FIG. 3. Step 134 deletes the trailer script, and step 136 deletes the empty regular action list for secondary packages and the dominant action package list.

In another implementation of add module 140, add module 140 merely adds the dominant package to the end of action list for dependent packages. The dominant package is then installed after the installation of the dependent packages.

While the invention has been particularly shown and described with reference to a preferred embodiment thereof, it will be understood by those skilled in the art that various other changes in the form and details may be made therein without departing from the spirit and scope of the invention.

I claim:

1. A method for installing a plurality of software packages in a computing system, at least one of the software packages being dependent on a dominant software package, said method comprising the computer implemented steps of:

reading for each dominant package to be installed the dependency list for the dominant package, said dependency list identifying dependent packages that the dominant package is dependent upon;

if the dominant package has a dependent package not already installed, constructing a trailer script process and an action list, said action list having action entries, each action entry identifying a package, said trailer script process controlling installation of packages on the action list;

adding to the action list the dependent package not already installed; and installing the dominant package and dependent packages.

2. The method of claim 1 wherein said installing step comprises the steps of:

adding an entry for the dominant package at the end of the action list;

calling the trailer script process to install the dependent packages and the dominant package on the action list.

3. The method of claim 1 wherein said installing step comprises the steps of:

installing the dominant package;

calling the trailer script process to install the dependent packages on the action list.

4. The method of claim 3 wherein said trailer script process comprises the steps of:

detecting an action entry on the action list; and installing the dependent package identified by the action entry.

5. The method of claim 4 wherein said trailer script process further comprises the steps of:

deleting from the action list the action entry for the dependent package installed by said step of installing the dependent package; and clearing the trailer script and the action list from the computing system if said detecting step detects an empty action list.

6. The method of claim 3 further comprising the steps of:

testing whether the dependent package, identified by the action entry from the action list, is also a dominant package having additional dependent packages;

identifying the additional dependent packages and adding action entries on the action list for the additional dependent package;

installing the dependent package having additional dependent packages; and deleting from the action list the action entry for the dependent package having additional dependent packages.

7. The method of claim 3 further comprising the steps of:

detecting whether the dominant package has a dependency list of dependent packages;

if there is a dependency list, reading a dependency entry identifying a dependent package;

checking if the dependent package has been installed;

if the dependent package has not been installed adding an action entry on the action list for the dependent package;

if the dependent package has been installed, reading the next dependency entry on the dependency list;

detecting when all action entries for the dependent packages for the dominant package have been listed on the action list; and installing the dominant package.

8. Apparatus for installing a plurality of software packages in a computing system, the computing system having a processor, an input/output device, and a data storage device, at least one of the software packages being dependent on a dominant software package, said apparatus comprising:

a test module testing whether or not a dominant package to be installed has dependent packages to be installed; the dominant package being dependent on the dependent packages for successful operation;

a construct module constructing an action list if said test module indicates the dominant package has a dependent package not already installed, said action list having action entries, each action entry identifying a package to be installed;

a trailer script module controlling installation of packages on the action list;

an action entry add module adding to the action list the dependent package not already installed; and an install module installing the dominant package and calling the trailer script module to install packages on the action list.

9. The apparatus of claim 8 wherein said install module comprises:

said action entry add module adding an entry for the dominant package at the end of the action list;

said trailer script module, when called by the install module, installing the dependent packages and the dominant package identified on the action list.

10. The apparatus of claim 8 wherein said install module comprises:

a primary install module installing the dominant package directly;

said trailer script module, when called by said install module, installing the dependent packages identified on the action list.

11. The apparatus of claim 10 wherein said trailer script module comprises:

a detection module detecting an action entry on the action list; and an action entry install module installing the dependent package identified by the action entry.

12. The apparatus of claim 11 wherein said trailer script module further comprises:

a delete module deleting from the action list the action entry for the dependent package installed by said action entry install module.

13. The apparatus of claim 10 further comprising:

a dependency check module checking whether the dependent package, identified by the action entry from the action list, is also a dominant package having additional dependent packages;

said action entry add module identifying the additional dependent packages and adding action entries on the action list for the additional dependent packages;

said action entry install module installing the dependent package having additional dependent packages; and said delete module deleting from the action list the action entry for the dependent package having additional dependent packages.

14. A computer program storage medium readable by a computing system and encoding a computer program of instructions for executing a computer process for installing a plurality of software packages in the computing system, at least one of the software packages being dependent on a primary software package, said computer process comprising the steps of:

reading for each primary package to be installed the dependency list for the primary package, said dependency list identifying secondary packages that the primary package is dependent upon;

if the primary package has a secondary package not already installed, constructing a trailer script process and an action list, said action list having action entries, each action entry identifying a package, said trailer script process controlling installation of packages on the action list;

adding to the action list the secondary package not already installed; and installing the primary package and secondary packages.

15. The computer program storage medium of claim 14 where, in the computer program, the computer process step of installing comprises the steps of:

adding an entry for the primary package at the end of the action list;

calling the trailer script process to install the secondary packages and the primary package on the action list.

16. The computer program storage medium of claim 14 where, in the computer program, the computer process step of installing comprises the steps of:

installing the primary package;

calling the trailer script process to install the secondary packages on the action list.

17. The computer program storage medium of claim 16 where, in the computer program, the trailer script process comprises the steps of:

detecting an action entry on the action list; and installing the secondary package identified by the action entry.

18. The computer program storage medium of claim 16 where said computer process in the computer program further comprises the steps of:

testing whether the secondary package, identified by the action entry from the action list, is also a primary package having additional secondary packages;

identifying the additional secondary packages and adding action entries on the action list for the additional secondary package;

installing the secondary package having additional secondary packages; and deleting from the action list the action entry for the secondary package having additional secondary packages.

19. The computer program storage medium of claim 16 where said computer process in the computer program further comprises the steps of:

detecting whether the primary package has a dependency list of secondary packages;

if there is a dependency list, reading a dependency entry identifying a secondary package;

checking if the secondary package has been installed;

if the secondary package has not been installed adding an action entry on the action list for the secondary package;

if the secondary package has been installed, reading the next dependency entry on the dependency list;

detecting when all action entries for the secondary packages for the primary package have been listed on the action list; and installing the primary package.

* * * * *